United States Patent
Dymond

[11] 3,837,097
[45] Sept. 24, 1974

[54] READING TRAINER
[75] Inventor: Russell H. Dymond, St. Louis, Mo.
[73] Assignee: Reading and Training Systems, Inc., St. Louis, Mo.
[22] Filed: Mar. 23, 1973
[21] Appl. No.: 344,365

[52] U.S. Cl. .................................. 35/35 B, 40/344
[51] Int. Cl. ...................... G09b 17/04, B41j 13/03
[58] Field of Search .................. 35/35 B, 35 C, 9 F; 40/341–349

[56] References Cited
UNITED STATES PATENTS

| | | | |
|---|---|---|---|
| 2,102,431 | 12/1937 | McNamara | 40/341 |
| 2,662,307 | 12/1953 | Simpson | 35/35 B |
| 2,691,831 | 10/1954 | Jordan | 35/35 B |
| 2,950,543 | 8/1960 | Ritter et al. | 35/35 C |
| 3,106,026 | 10/1963 | Jackson et al. | 35/9 F |

*Primary Examiner*—Wm. H. Grieb
*Attorney, Agent, or Firm*—Glenn K. Robbins

[57] ABSTRACT

An automated reading trainer having provisions for manual or automatic feed. The trainer is in the form of a housing having a front opening for receiving a printed sheet of material with chute means for returning the paper after being fed to the machine through the front thereof. The trainer has a specially designed on and off switch mechanism which causes the engagement of sheet feed means with motor driven means to automatically feed the paper through the machine. The switch in the off position disengages the feed mechanism and permits manual movement of feed rollers to advance the printed sheet at desired speed or to rest the sheet within a viewing aperture. The machine has an aperture or viewing shutter in the form of a plate having a simple handle flange whereby the shutter can be manually moved to expose or narrow the viewing opening to view selected portions of the sheet within the viewing aperture.

5 Claims, 7 Drawing Figures

READING TRAINER

BACKGROUND OF THE INVENTION

In the past various types of reading trainers have been devised. One such trainer is shown in Jordan U.S. Pat. No. 2,691,831 which comprises a housing having means for receiving a printed sheet from the rear and feeding it past a viewing aperture. Speed control was devised by a constantly engaged drive mechanism creating constant wear on the drive mechanism whether the device is operated manually or automatically.

By means of the instant invention there has been devised an automatic or manual operated reading trainer which can be simply used by students and anyone desirous of increasing their reading rate and comprehension ability. The machine is devised for improving reading and comprehension skills and can be employed for comprehension course test to determine the advance in reading comprehensions and skill.

The reading trainer is comprised of a housing having a front feed slot whereby the printed sheet can be viewed as it is fed through the slot to be engaged by feed rollers to be fed through a narrow guide passage way with positive control and be fed back to the reader through a chute at the bottom of the machine. A drive mechanism is designed in order that an on-off switch can engage or disengage the automatic drive mechanism and eliminate wear and tear when the machine is operated manually. An on-off mechanism when "on" causes the engagement of a drive roller at varying points on the surface of a motor driven cone and the frictional engagement of the drive roller with the cone causes the movement of a gear train connecting the feed rollers to advance the sheet through the trainer. In the "off" position determined by the operation of the on and off switch the drive roller is caused to be moved by a pivotable bracket upon which the drive roller is mounted by cam operation away from engagement with the motor driven cone and the feed rollers can be manually moved by a manually controlled knob.

The rate of speed is determined by adjustment of a speed control knob which operates on a rack and pinion to vary the movement of a belt which is keyed to the drive roller to cause it to move axially along the surface of the cone which determines the rate of speed depending upon the position of the drive roller on the cone.

The speed control is visually shown by a speed control panel located underneath the viewing panel in order that the user can determine the rate of speed when the trainer is operated automatically.

In order that the trainer can be used to expose larger or narrower portions of the viewing aperture a manually operated aperture shutter has been devised. This shutter is in the form of a simple cover plate which has a flange handle whereby it can be manually moved to open fully or partially close the viewing aperture to expose one or more lines of the printed sheet to train the eye and develop disciplined reading skill.

The reading trainer is rugged in construction and is simply designed for use by elementary students as well as college students and anyone desirous of improving their reading skill and comprehension. The automatic feed mechanism has a reduced wear and tear on the unit which is of great value when the machine is used by entire classes of students.

The above features are objects of this invention and further objects will appear in the detailed description which follows and will be otherwise apparent to those skilled in the art.

For the purpose of illustration of this invention there is shown in the accompanying drawings a prefered embodiment thereof. It is to be understood that these drawings are for the purpose of example only and that the invention is not limited thereto.

Figure 1:
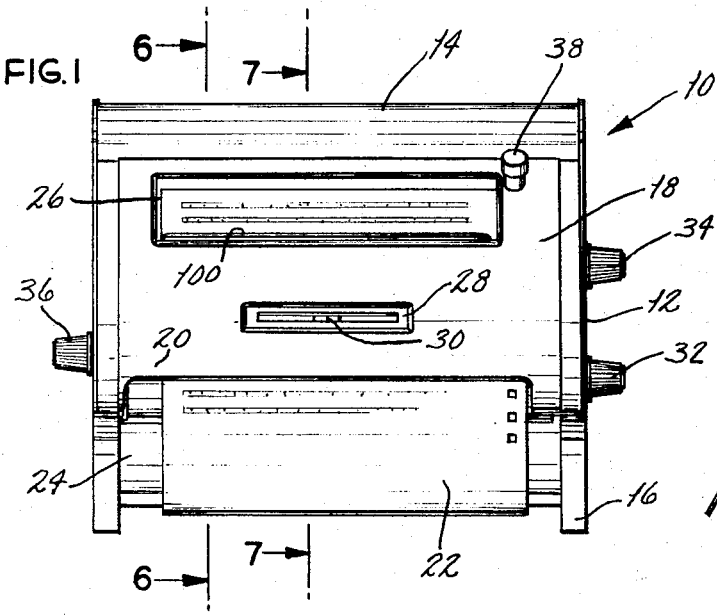
FIG. 1 is a view in front elevation of the reading trainer.
Figure 2:
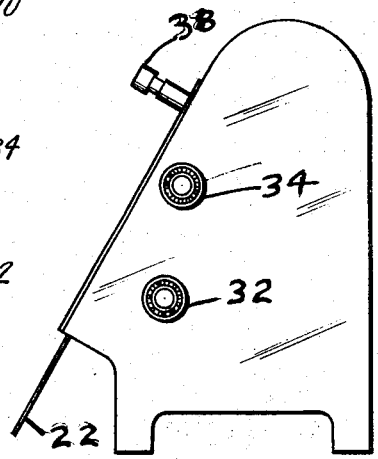
FIG. 2 is a view in side elevation taken from the right side of FIG. 1.
Figure 3:
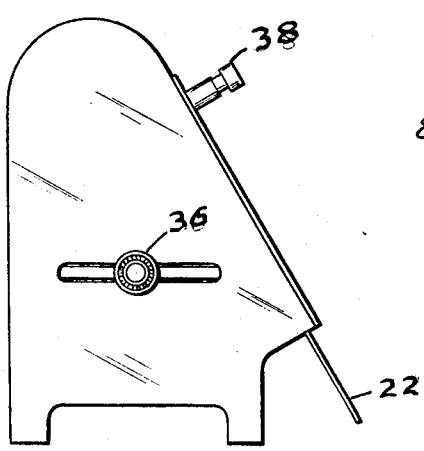
FIG. 3 is a view in side elevation taken from the left side of FIG. 1.

DESCRIPTION OF THIS INVENTION:

The reading trainer of this invention is generally designated by the reference numeral 10 in FIGS. 1, 2 and 3. It is comprised of a housing 12 having a top cover 14 and legs 16 for support upon a desk, table or the like. A front panel 18 has an inlet opening 20 to receive a printed sheet 22 and a bottom outlet 24 for discharge and return of the sheet at the front of the machine.

A viewing aperture 26 is positioned at the top portion of the front panel and a speed or lines per minute panel 28 having a speed indicator needle 30 is positioned at the intermediate portion of the front panel. An on-off switch 32 is positioned at the right side of the machine for turning the automatic feed mechanism on or off. In the "off" position a manual control knob 34 positioned at the right side of the machine is used for manually driving feed rollers to feed the printed sheet through the machine. At the left side of the machine a speed control knob 36 is positioned. This knob may be used to vary the speed of the automatic mechanism and vary the rate of the sheet through the unit as desired. A punch 38 is positioned at the upper right portion of the front panel of the machine to be used in multiple choice questions to punch out an appropriate block on an exam sheet.

Figure 6:
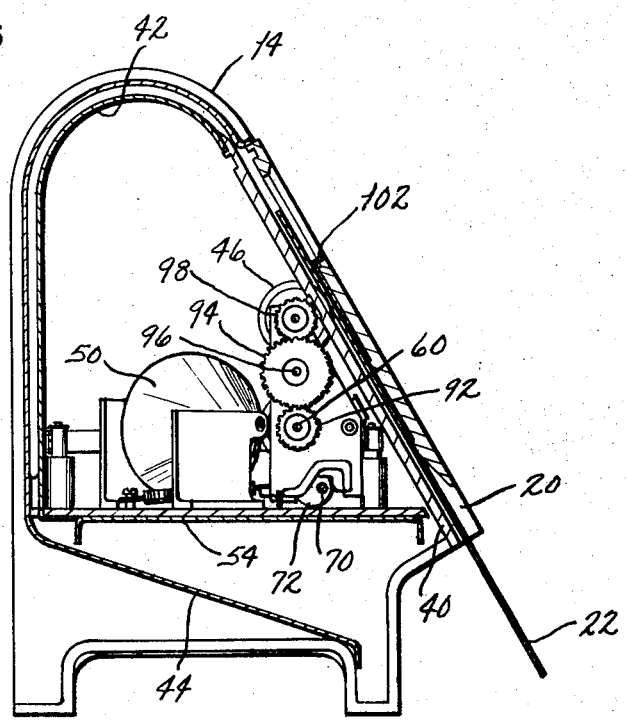
FIG. 6 is an enlarged view in vertical cross section taken on the line 6—6 of FIG. 1.

The sheet guide construction is best shown by reference to FIGS. 1, 2, 3, 6 and 7. The sheet inlet opening 20 is formed by the front panel 18 of the housing and an underlying rest panel 40 which extends from one side of the housing to the other underneath the front panel to define a narrow passage way to receive the sheet there between. A curved guide panel 42 forming a continuation of the rest panel 40 is positioned underneath the top panel 14 at the top of the machine and extends downwardly at the rear thereof. The front panel 14 has a bottom chute portion 44 as best shown in FIG. 6 which extends downwardly to the front of the machine and to the outlet opening 24. The sheet is advanced through the unit by a pair of feed rollers 46 and 48 which have a periphery of a resilient rubber-like material to resiliently engage the sheet by friction and cause the advancement of the sheet through the machine. The automatic or manual driving of the feed rollers will be discussed in more detail below.

The drive mechanism for automatically feeding the sheet through the unit is comprised of the drive cone 50 driven at a constant speed by motor 52. A base 54 extending between the sides of the housing supports the drive mechanism. A gear train bracket 56 supports the motor driven mechanism and is pivotally mounted upon shaft 58 which is connected to the manual conrol knob 34. This shaft also supports the feed roller 46 and 48 previously described.

The gear train bracket 56 supports a drive roller shaft 60 which is journalled in opposite sides 62 and 64 of the gear train bracket. A drive roller 66 is mounted on shaft 60 and is caused to be engaged and disengaged with the motor driven cone 50 for automatic and manual movement respectively by the operation of the on and off switch as will be further desribed. The actuation of the on and off switch causes pivotal movement of the gear train bracket moving the drive roller into and out of the engagement with the drive cone.

Figure 5:
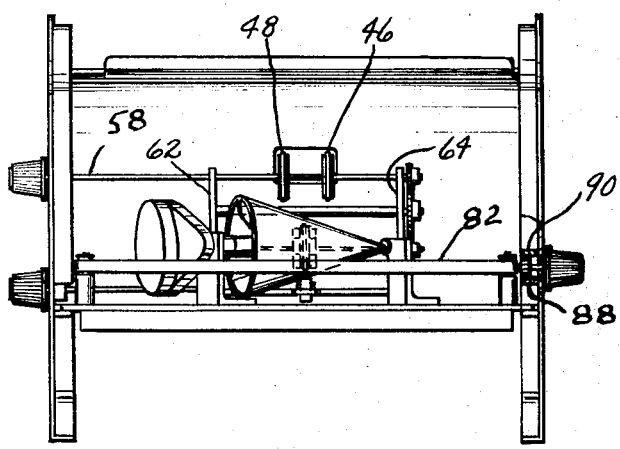
FIG. 5 is a view in rear elevation with the cover removed to show the interior.
Figure 7:
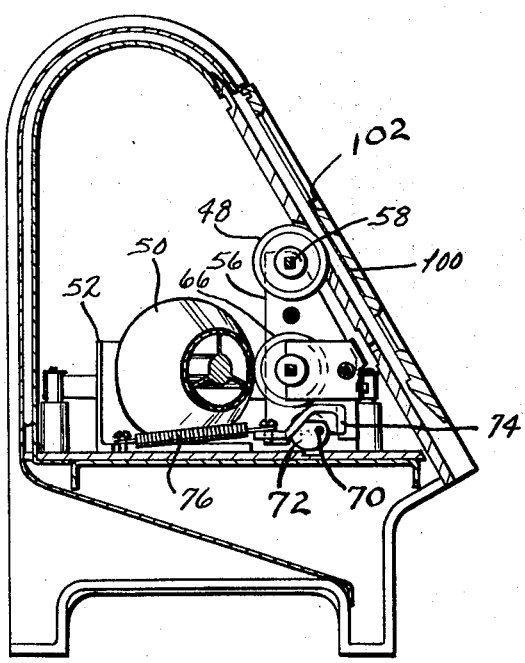
FIG. 7 is an enlarged view in vertical cross section taken on the line 7—7 of FIG. 1.

The on-off switch 32 is keyed to shaft 70 as best shown in FIGS. 5, 6 and 7. The shaft 70 supports a cam 72 which is keyed to the shaft and by engagement with the contact surface 74 of the bottom wall of the gear train bracket 56 causes the bracket to pivot about the shaft 58 clockwise and counterclockwise to bear against the motor driven cone or move out of engagement depending upon whether the on-off switch is in the "on" position for automatic operation or the "off" position for manual operation. A biasing spring 76 fixed at one end, as best shown in FIG. 7, to the base 54 and at the other end to the bottom wall of the gear train bracket biases the gear train bracket into engagement with the cam 72.

The speed control in the automatic operation of the trainer is designed to vary the speed depending upon the engaging position of the drive roller 66 with the surface of the motor driven cone. In the adjustment opposition shown in FIG. 4 the cone is in driving engagement with the drive roller and to vary the speed as viewed in FIG. 4 the drive roller when moved toward the apex of the cone will slow the speed and when moved towards the base of the cone (in other words towards the right as viewed in FIG. 4) the speed will be increased. The motor driven cone operates at a constant speed and the surface speed at the point of engagement of the cone with the drive roller determines the rate of speed.

Figure 4:
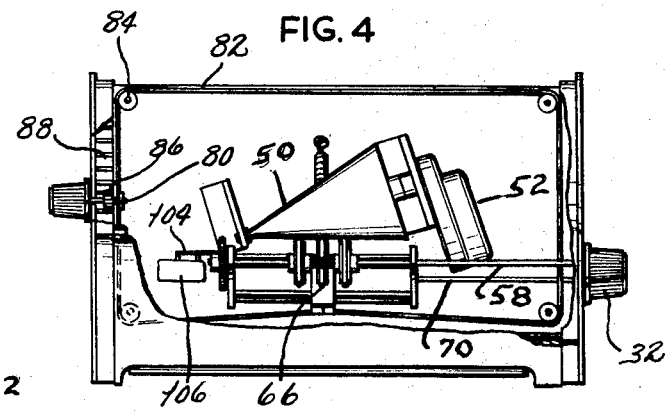
FIG. 4 is a top plan view of the trainer with the top cover of the housing partially broken away to show the interior.

The adjustment of the speed of the drive roller is effected through the speed control knob 36. This knob as best shown in FIGS. 1 and 4 is connected by a shaft 80 to a belt 82 which is supported by idler rollers 84. The shaft 80 is keyed to a pinion gear 86 which is in engagement with a toothed rack 88 and as shown in FIG. 5 the pinion is confined in a track by a top rail 90 in order that the pinion can move back and forth on the rack by turning speed control knob.

The speed of the automatic drive and advancement of the sheet through the unit is shown in "Lines Per Minute" on the speed indicating aperture 28. The speed indicating needle or pointer 30 is keyed to the belt 82 and moves with the belt as it is moved back and forth by the adjustment of the speed control knob 36 to vary the opsition of the drive roller 66 in engagement with the motor driven cone.

The gear train mechanism connecting the drive roller 66 with the feed rollers 46 and 48 is best shown in FIGS. 6 and 7. As there shown a shaft 60 supporting the drive roller is keyed to a gear 92 which is in engagement with an idler gear 94 supported upon a shaft 96 extending between the side walls of the gear train bracket. An idler gear 94 is in engagement with the gear 98 which is keyed to the end of the shaft 58 supporting the drive rollers 46 and 48.

The aperture adjustment shutter 100 is best shown in FIGS. 1, 6 and 7. It is comprised of a flat plate portion 100 having a flange 102 which serves as a handle. The flat plate portion 100 rides over a window glass portion fitting underneath the front panel and spaced from the underneath side to leave a slot to receive the shutter. The shutter is adjusted upwardly and downwardly within the aperture shutter to the desired position for viewing of the selected portion of the printed sheet exposed within the aperture.

OPERATION

The reading trainer is employed by supporting it on a table where lighting is proper for good reading. The desired speed is determined by rolling the speed control knob 36 to the desired position in the "Lines Per Minute" speed control slot 28 where the speed indicator 30 is adjusted to the appropriate speed level.

Loading of the machine with the printed sheet 22 is effected by inserting a sheet face up in the inlet of the loading slot 20 at the bottom of the housing. The paper is then fed manually up through the guide means until it is engaged by the feed rollers 46 and 48. Manual operation can be simply effected when the "on and off" switch 32 is "off" and the drive roller is disengaged from the drive cone. This manual adjustment is effected by simply moving the manual knob 34 which is keyed to the feed rollers 46 and 48. The resilient rubber periphery frictionally engages the sheet and causes it to be fed upwardly in the channel between the top cover 14 and the guide or rest plate 42.

In the automatic operation the on-off switch is turned to the "on" position. When so turned to the "on" position the knob 32 rotates the shaft 70 to cause the cam 72 to engage the bottom of the pivotable gear train bracket and cause it to move toward the drive cone and engage frictionally the drive cone with the drive roller 66. The drive roller actuates the gear train motor drive to the feed rollers 46 and 48 to move the sheet through the unit at the desired rate of speed.

The actuation of the drive motor is effected by the on-off switch 32 through the movement of the gear train bracket. As the gear train bracket is moved it contacts the switch member 104 which closes the switch 106 to the motor 50 causing the motor to operate and effect the automatic operation of the unit.

The aperture shutter is simply employed for exposing one or more lines of the printed sheet material as desired. This is effected by simply moving the aperture shutter up or down to screen the viewing aperture 26 to the desired width.

Various changes and modifications may be made within this invention as will be readily apparent to those skilled in the art. Such changes and modifications are within the scope and teaching of this invention as defined by the claims appended hereto.

What is claimed is:

1. A reading trainer comprising; a housing having a front panel and two end panels; means for receiving a printed sheet in the housing; a viewing aperture in the front panel exposing a selected portion of the sheet; said housing having a sheet inlet slot at the front of the housing above the front panel, a return slot at the front of the housing underneath the front panel, a third slot in an end panel of the housing and guide means comprising a pair of spaced curved members defining a passageway through which the sheet is fed from said inlet slot to said return slot; belt means in said housing; a shaft connected to said belt means; an adjustable speed control knob mounted on said shaft, said knob being movable in said third slot, the movement of said knob causing the movement of the belt means; and a variable speed means connected to the belt means for feeding the sheet at varying rates of speed.

2. The reading trainer of claim 1 in which a speed indicating member is connected to said belt and moves with it responsive to the movement of said speed control knob.

3. The reading trainer of claim 1 in which said variable speed means comprises a friction drive wheel keyed to and axially moveable along a shaft responsive to the movement of said belt, said friction wheel being biased into engagement with the surface of a constant speed motor driven cone having a surface of revolution parallel to the shaft supporting the friction wheel and said shaft being connected to means for feeding said sheet at varying rates of speed responsive to the engagement position of the friction wheel upon said cone.

4. The reading trainer of claim 3 in which the drive wheel is supported on a pivotable bracket means, said bracket means being pivotally moveable by a cam means moveable by an on-off knob into drive roller and said motor driven cone engagement in an "on" position and out of engagement in an "off" position.

5. The reading trainer of claim 4 in which a manual control knob is connected to a drive shaft carrying feed rollers frictionally engageable with the sheet, said drive shaft being further connected to a gear train means connecting the drive roller.

* * * * *